Patented Feb. 9, 1937

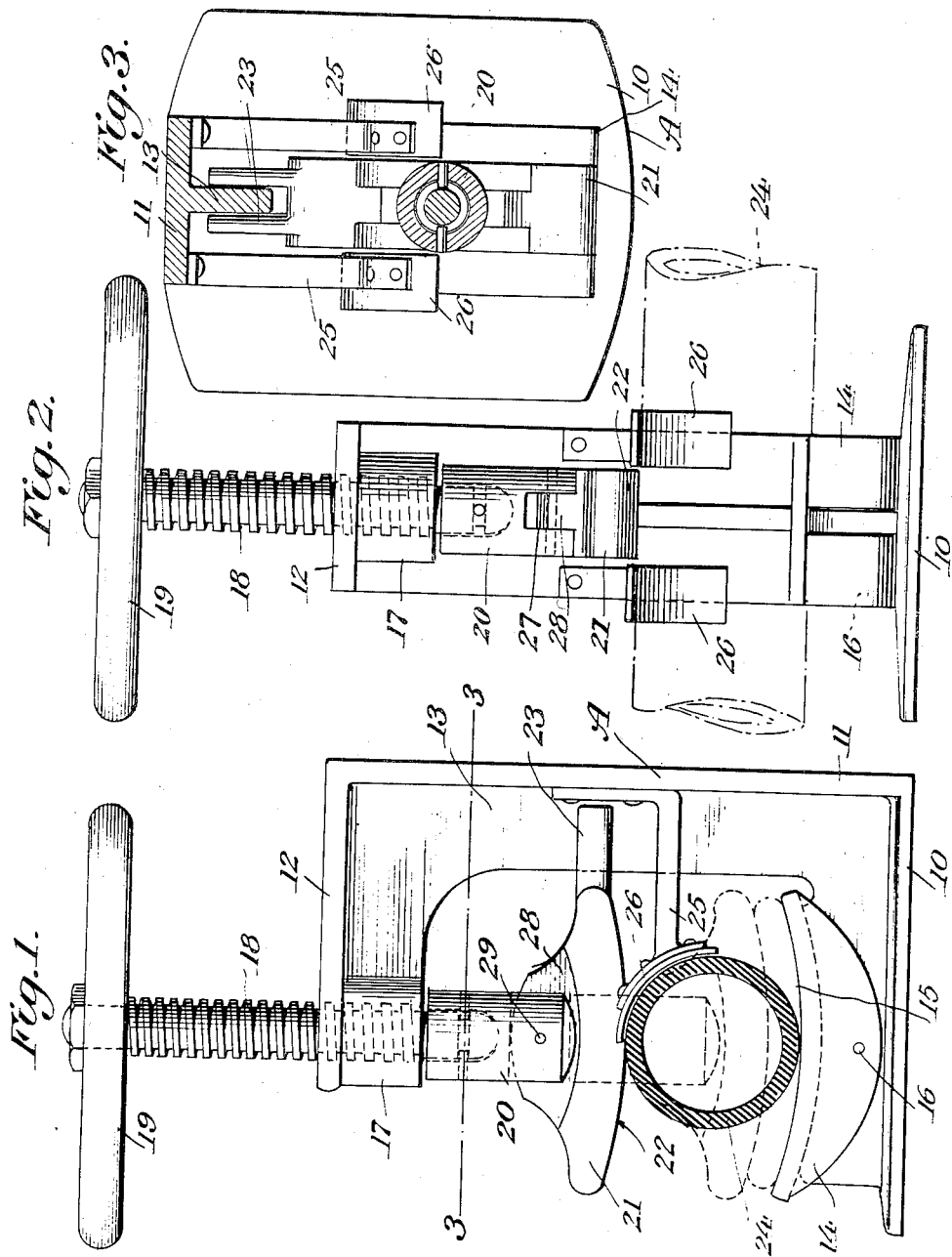

2,070,143

UNITED STATES PATENT OFFICE 2,070,143

HOSE CLAMP

Charles F. Schisler, Nanticoke, Pa.

Application September 21, 1936, Serial No. 101,857

1 Claim. (Cl. 251—5)

The invention relates to a hose clamp and more especially to a hose gate.

The primary object of the invention is the provision of a clamp or gate of this character, wherein the water supply through a length of hose can be stopped so as to cut off the flow of water therethrough when the occasion may require and thus eliminating the necessity of closing the valve or supply outlet for such water, as, for example, at a water plug for this purpose, the body of the hose being compressed with the result that the water can be readily shut off irrespective of the direction of its flow therethrough.

Another object of the invention is the provision of a clamp or gate of this character, wherein the water supply through a hose can be checked and is of a kind for use by fire departments so that in event of a breakage or leakage in a hose line the water can be controlled thus assuring safety and avoiding resultant accidents particularly when the hose is used with high pressure water, the clamp or gate being of novel construction and being susceptible of quick attachment and detachment and also manipulation.

A further object of the invention is the provision of a clamp or gate of this character, wherein the same can be operated at any angle or position, in narrow places and in spaces large enough for one man to get through while such clamp or gate when not in use can be stored in the least possible space.

A still further object of the invention is the provision of a clamp or gate of this character, which is simple in construction, thoroughly reliable and effective in its operation, strong, durable, readily and easily portable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is an elevation of a clamp or gate constructed in accordance with the invention, the same being shown applied to a hose, the hose being in section and by dotted lines compressed for shutting off water supply therethrough while by full lines the said hose is opened for free water flow.

Figure 2 is a front elevation of the clamp or gate.

Figure 3 is a sectional view on the line 3—3 of Figure 1.

Similar reference characters indicate corresponding parts throughout the several views in the drawing.

Referring to the drawing in detail, the clamp or gate comprises a casting forming a substantially C-shaped frame A including a base 10, an upstanding shank 11 and an overhanging guide 12 with respect to said base, respectively. The base, shank and guide have formed therewith a medial web 13 and such at the base 10 carries a saddle-like jaw 14 formed with a concaved work engaging face 15. The jaw 14 is detachably fastened in place by a fastener 16, this being centrally located with relation to said jaw.

The guide 12 with its web 13 is formed with a unitary feed nut 17 having threaded therein a feed screw 18 which at its upper end has fixed thereto a hand wheel 19.

Swiveled on the lower end of the screw 18 is a coupling or bearing 20 in which is fitted a self-adjusting jaw 21 having a convexed work engaging face 22, this jaw 21 being a companion to the jaw 14 and being provided with a forked heel extension 23 straddling the web 13 of the shank 11 of the frame A so that the said jaw 21 will not turn with the screw 18 and at the same time is self-adjusting. A hose 24 to be compressed for shutting off water flow therethrough is introduced through the open side of the frame A between the jaws 14 and 21 then by moving the jaw 21 toward the jaw 14 the said hose will be compressed to a degree to stop flow of water or other liquid therethrough.

The shank 11 of the frame A at proper location carries a pair of brackets 25, these being spaced from each other and disposed at opposite sides of the jaw 21 and carrying hose abutments 26 for engaging with the hose 24 when being placed within the frame A between the jaws 14 and 21 prior to the compressing of such hose and in this manner the hose will be properly centered with relation to the jaws within said frame A whereby such hose can be successfully compressed for shutting off water flow therethrough.

The coupling or bearing 20 is formed with a bifurcation 27 to accommodate an ear 28 on the jaw 21 and received by the said coupling or bearing and the ear is the fastener 29 for detachable securing of the jaw 21 with said coupling or bearing.

The jaw 21 is advanced or receded from the jaw 14 by manual manipulation of the wheel 19 through the instrumentality of the screw 18, this being obvious from Figures 1 and 2 of the drawing.

The clamp or gate is serviceable to fire departments and there being no keys, gears or similar locking devices employed to impede the work of the firemen, the water flow through such hose can be shut off with dispatch and with certainty in the use of the said clamp or gate.

What is claimed is:

A clamp of the character described comprising a substantially C-shaped frame, a clamping jaw carried by the frame, a feed screw adjustably fitting said frame, a clamping jaw mounted for self-adjustment to the said feed screw and confronting the first-mentioned jaw, a guide extension on the last-mentioned jaw and slidably fitting said frame, means detachably connecting the jaws in place, brackets carried by said frame, and hose abutments on said brackets for positioning a hose between the confronting jaws and located out of the path of movement of the first-mentioned jaw.

CHARLES F. SCHISLER.